United States Patent [19]

Quinan et al.

[11] 3,893,826

[45] July 8, 1975

[54] COATED ABRASIVE MATERIAL COMPRISING ALUMINA-ZIRCONIA ABRASIVE COMPOSITIONS

[75] Inventors: James R. Quinan, Loudonville, N.Y.; Joseph E. Patchett, Niagara Falls, Canada

[73] Assignee: Norton Company, Worcester, Mass.

[22] Filed: Aug. 13, 1973

[21] Appl. No.: 388,013

Related U.S. Application Data

[63] Continuation-in-part of Ser. No. 196,838, Nov. 8, 1971, abandoned, which is a continuation of Ser. No. 814,162, April 7, 1969, abandoned.

[52] U.S. Cl. .................... 51/295; 51/298; 51/298.1
[51] Int. Cl.² ..................... B24D 11/00; C09K 3/14
[58] Field of Search ............. 51/295, 298, 293, 309

[56] References Cited
UNITED STATES PATENTS

| | | | |
|---|---|---|---|
| 2,194,472 | 3/1940 | Jackson | 51/298 |
| 2,740,725 | 4/1956 | Ball | 51/298 |
| 2,970,929 | 2/1961 | Hansen et al. | 51/298 |
| 2,981,615 | 4/1961 | Baumgartner et al. | 51/298 |
| 3,156,545 | 11/1964 | Kistler et al. | 51/309 |
| 3,175,894 | 3/1965 | Foot | 51/309 |
| 3,181,939 | 5/1965 | Marshall et al. | 51/309 |
| 3,205,054 | 9/1965 | Tucker | 51/298 |
| 3,525,600 | 8/1970 | Yoshikawa et al. | 51/295 |
| 3,646,713 | 3/1972 | Marshall et al. | 51/309 |
| 3,781,172 | 12/1973 | Pett et al. | 51/309 |

*Primary Examiner*—Donald J. Arnold
*Attorney, Agent, or Firm*—Oliver W. Hayes

[57] ABSTRACT

Flexible abrasive products are made by conventional coated abrasive manufacturing techniques, but employing abrasive grain made from a fused alumina-zirconia abrasive composition containing from 10 to 60% zirconia by weight and having a primary numerical average crystal size less than 50 microns and a colony size of eutectic composition of less than about 65 microns.

1 Claim, No Drawings

COATED ABRASIVE MATERIAL COMPRISING ALUMINA-ZIRCONIA ABRASIVE COMPOSITIONS

CROSS-REFERENCE TO RELATED APPLICATIONS

This application is a continuation-in-part of application Ser. No. 196,838, filed Nov. 8, 1971, which is a continuation of application Ser. No. 814,162, filed Apr. 7, 1969, both now abandoned.

BACKGROUND OF THE INVENTION

1. Field of the Invention

This invention relates, in general, to coated abrasive material and abrasive articles manufactured therefrom. More particularly, it relates to coated abrasive material comprising abrasive grains of an alumina-zirconia abrasive composition.

2. Description of the Prior Art

Coated abrasive material, or as it is sometimes more commonly called "sandpaper," comprises, in general, a relatively flexible backing member onto the surface of which is adhesively secured a plurality of abrasive grains. The adhesive bond can be, depending somewhat on the particular application for the abrasive material, of natural or synthetic material, e.g., animal hide glue and heat hardenable resins such as phenol-formaldehyde are conventionally used. The adhesive bond can include, as is often done, a "size coat" in combination with the so-called "maker adhesive." The size coat may or not, as desired, be of the same composition as the maker adhesive.

Prior to the present invention, essentially all commercially produced aluminous abrasives used in making coated abrasive material employed abrasive grains which were essentially single crystals or portions of single crystals of alumina. Although some larger abrasive grains might have comprised two or three intergrown crystals, the grains have been essentially monocrystalline. This is true in spite of the fact that truly poly-crystalline alumina grain has been known and used now for many years in bonded abrasive (i.e. grinding wheel) applications where toughness and durability of the abrasive material is an important requirement.

In recent years, there has been introduced a new family of microcrystalline aluminous abrasives made from fusions containing alumina and from 10 to 60% by weight of zirconia. Such an abrasive composition is disclosed in U.S. Pat. No. 3,181,939 which issued on Nay 4, 1965 to Norton Company, assignee of the present invention. Therein abrasive compositions are disclosed where, depending on the relative proportions of alumina and zirconia, any composition thereof will be made up of one of the following:

1. Zirconia crystals together with the low melting alumina-zirconia eutectic;
2. the alumina-zirconia eutectic alone; or
3. alumina crystals together with the low melting alumina-zirconia eutectic.

As disclosed in the patent, the primary crystals have an average crystal size no greater than 300 microns and the alumina-zirconia eutectic composition consists of a uniform dispersion of extremely small zirconia particles in a matrix of alumina. The abrasive material is disclosed to be of high impact strength making it particularly useful as a wheel abrasive for snagging operations.

The eutectic composition in an alumina-zirconia composition is reported to occur at 41% zirconia, by weight, (Schmid and viechnicki, Journal of Materials Science 5 (1970), pp. 470 to 473). It can, of course, vary somewhat due to impurities, the more correct value being probably 43% in these abrasive compositions; however, it can concievably be as high as 45%.

Abrasive material (ZM Lionite) of the above family - 25% by weight zirconia - having a primary crystal size averaging about 42 microns is also known. This abrasive grain, suitable for abrasive wheel manufacture, has been available commercially now for some time.

We are also aware that abrasive grain of an alumina-zirconia abrasive composition (essentially eutectic) has been used in the manufacture of coated abrasive material, and is referred to in the trade as CUBICUT. This abrasive grain has a strong blocky shape and; as far as we have been able to determine, coated abrasive material using this type abrasive grain has found only limited application, e.g., in foundry applications where, as in an abrasive wheel application involving snagging, toughness and durability of the abrasive material is an important requirement. In some general usage, however, these alumina-zirconia abrasive materials have not been found significantly better than prior art aluminous abrasive for coated abrasive applications.

SUMMARY OF THE INVENTION

We have now discovered, quite unexpectedly, it is believed, that alumina-zirconia abrasive compositions in which the zirconia content varies from 10 to 60% and in which the primary average crystal size is less than 50 microns, results in coated abrasive products of significantly higher cutting efficiency than any previously known aluminous or alumina-zirconia coated abrasives.

In accordance with the basic and general aspects of this invention, there is provided coated abrasive material comprising a backing member on which is adhesively secured abrasive grains of an alumina-zirconia microcrystalline abrasive composition having a zirconia content of from 10 to 60% by weight. These abrasive compositions are characterized by the inclusion of an alumina-zirconia eutectic composition, depending upon impurities, containing about 43% by weight of zirconia. Aside from the eutectic (which may comprise essentially 100% of the product where the zirconia content is 41 to 45%) the abrasive composition contains primary crystals of alumina (if the zirconia content is below the eutectic composition), or primary crystals of zirconia (if the zirconia content is higher than the eutectic composition).

The alumina-zirconia abrasive compositions having utility in the present invention are distinguished from other, previously known alumina-zirconia abrasive compositions used in the manufacture of coated abrasive material, in either their relatively small crystal size, e.g., an average crystal size of less than 50 microns, or their eutectic colony size, e.g., less than 65 microns, produced by rapid chilling of the fusion of alumina and zirconia. Although the method for producing these abrasive compositions forms no part of the present invention, abrasive grains of such a composition are commercially produced for use in bonded abrasives (e.g., grinding wheels). One unique method of production is disclosed in the prior application, Ser. No. 720,082, of Pett and Kinney, filed Apr. 10, 1968 which issued as U.S. Pat. No. 3,781,172 on Dec. 25, 1973 from continuation-in-part application Ser. No. 98,014.

Abrasive material in accordance with the invention advantageously results in coated abrasive products having significantly higher resistance to dulling and higher overall cut, particularly in the grinding of certain metals, than previously known coated abrasive products.

DETAILED DESCRIPTION OF THE INVENTION AND THE PREFERRED EMBODIMENTS

Abrasive material in accordance with the general aspects of the invention comprises a backing member to the surface of which is adhesively bonded abrasive grains of an alumina-zirconia abrasive composition having a zirconia content of from 10 to 60% (by weight). The abrasive compositions, as before-mentioned, are characterized by the inclusion of an alumina-zirconia eutectic composition, containing from, depending on the impurities present, about 41 to 45% zirconia.

In compositions in which the overall zirconia content is below the eutectic composition such that primary alumina crystals are formed, suitable material for the practice of the present invention must have a numerical average crystal size of the primary crystals of less than 50 microns. When the composition is such that primary zirconia crystals are formed, these crystals must also average less than 50 microns. Where the composition is close to that of the eutectic, in which case few primary crystals are observable, it has been found that measurement of the colony size of the eutectic composition is useful to detmine suitability of the abrasive composition for this invention. Although the alumina, e.g. alpha alumina, and zirconia crystals forming the eutectic composition are submicron in size, those crystals are associated in clearly discernable groups or colonies having distinguishable boundaries. These colonies are generally about 25% larger in average size than the primary crystals which may be present. Thus, suitable abrasive materials for the present invention can be characterized as having a primary crystal numerical average size of less than 50 microns, preferably less than 30 microns, or a eutectic colony size of less than 65 microns, preferably less than 37 microns.

As before-metioned, one method of obtaining an abrasive material such as is required in the practice of this invention is disclosed in application Ser. No. 720,082. In general, and as disclosed in that application, an alumina-zirconia fusion of the desired composition is cast over solidified lumps of a similar composition, thereby causing the entire molten material to freeze rapidly, resulting in a solid mixture which possesses a high degree of microcrystallinity.

The eutectic colonies in the alumina-zirconia abrasive compositions found suitable in the practice of this invention are characterized in having rods (or platelets) of zirconia in a matrix of alumina. These rods (or platelets) of zirconia have been determined to have an average diameter of less than 3000 angstroms. Measurements of the rod diameter have been achieved by direct sealing of scanning electron microscope photographs with magnifications of 5000X to 10,000X; in X cases magnification of 20,000X has been used. Since the diameters of the zirconia rods generally increase from the center of the eutectic colonies to the outer edges of the colonies, it is preferred to make the measurements near the center of the colonies. This is also believed to be the most useful measuring technique in characterizing the colonies since the growth rate in various portions of the periphery of the colonies may be different (due to geometrical effects) and therefore the rod diameters and rod spacings will be different. Additionally, impurities will congregate at the edges of the eutectic colonies and this will also disrupt the rod spacings and rod diameters, thus giving dimensions which are generally considerably larger than the dimensions near the center of the colonies. The abrasive properties of the eutectic-containing abrasive grain compositions are probably more critically dependent upon the dimensions at the colony centers.

Although the discussion of zirconia particle size in the alumina-zirconia eutectic has been based predominantly on size characterization of "rods," there is stron evidence that, in addition to "rods" being present, a substantial portion of the zirconia is in the form of platelets, these platelets having a thickness of the same order as the "rod" diameters. In some of the earlier work wherein rods were identified in scanning electron photomicrographs, further analysis of thses samples indicates that these "rods" were in fact platelets. This determination was made by etching the alumina from the region of the alumina-zirconia eutectic colony and re-examining the etched sample under a scanning electron microscope.

In the preceding discussion, the rod diameter has been referred to as an important parameter to be measured. As a practical matter it is probably better to use rod spacing as the measured parameter rather than rod diameter, since rod spacing is not as critically dependent upon the resolution of the electron microscope. This is particularly true where the rod appears to have a fuzzy edge and it may be difficult to precisely determine the actual diameter to be measured. However, the spacing between two rods or two platelets having fuzzy edges can be quite accurately measured by measuring the distance between the centers of the two rods or platelets. The rod spacing and rod diameters are directly related by the following approximate equation:

$$d_1 = \sqrt{\frac{\pi d_2}{4V_f}}$$

Wherein $d_1$ is the distance between the centers of adjacent rods, $d_2$ is rod diameter, and $V_f$ is the volume fraction of zirconia.

Platelet spacing and platelet thickness are also directly related.

In the measurement of rod (or platelet) spacing a convenient method to use is the random intercept technique which consists of drawing a straight line (real or imaginary) across a photomicrograph of the area where the rod spacing is to be measured, this line being normal to the rod axis or platelet plane. The number of rods or platelets intercepted by the line are then counted over a given distance to obtain the average rod or platelet spacing.

Abrasive grains, i.e., particles of abrasive material resulting from crushing the solidified alumina-zirconia composition, depending on the composition, contain a plurality of primary crystals and colonies or cells. Depending on the particular grit size, the abrasive grains may contain an association of groups of colonies having similar orientation which, following the terminology of the metallurgists are also referred to as grains. Thus, individual abrasive grains, i.e., abrasive particles, useful in the practice of this invention are polycrystalline, i.e., they are composed of crystalline alumina and zirconia, these abrasive grains resulting from the crushing of a rapidly cooled composition of a fusion of alumina and zirconia, with or without minor amounts of impurities.

The preferred abrasive grains used in the practice of the invention comprise essentially alumina-zirconia eutectic colonies. The generally parallel orientation of associated colonies in these abrasive grains, as beforementioned, is believed to create unique fracture characteristics of abrasive material which makes it particularly useful in the practice of this invention. This new type of fracture provides continuous "sharpening" of the fractured abrasive grains by exposing new cutting edges, thereby prolonging the useful life of the abrasive article. This fracture, a major portion of which takes place along colony and grain (groups of colonies) boundaries results in striated or columnar surfaces along the plane of fracture parallel to the long axes of the colonies, and a stepped surface for factures perpendicular to the axes of the colonies. When examined under a microscope with relatively low magnification the edges defined by intersection of two planes of fracture are discontinuous, jagged, and sharp. Also observable in some fractures is a jaggedness and irregularity in the columnar structure apparently resulting from slight misalignments of colonies in adjacent grains (groups of colonies).

For the purpose of this application, the type of fracture described above and exhibited by the most preferred abrasive grain used in this invention is referred to herein as "psuedohackly" to distinguish from the term "hackly" as used by mineralogists in describing a somewhat different fracture exhibited by minerals (single crystal, or sometimes polycrystalline, compounds or elements). When a large portion of the abrasive grains in a given batch of abrasive grains exhibit the psuedohackly fracture described above, the abrasive grain batch will be particularly useful in the practice of the more preferred aspects of this invention.

Useful grit sizes range from 16 to 80 and finer as defined by convention grit sizing as, for example, by the U.S. Department of Commerce Commercial National Bureau of Standards PS8-67 issued Jan. 9, 1967. The more preferred grit size, however, is 24-36.

In the preparation of abrasive grain, crude abrasive is reduced in size by one or more various means, e.g., jaw crushing, impact crushing, rolls crushing, etc.. Alumina-zirconia abrasive compositions theretofore have been conventionally impact crushed and mulled to produce abrasive grains of suitable grit size.

The preferred abrasive grain to be employed in coated abrasive articles, in particular in applications where the unit pressure upon the abrasive grains is to be moderate, is one which the abrasive material has been subjected, at least in the final crushing operation, to a conventional rolls crushing operation. This results in a so-called "weak shaped" abrasive grain, i.e., elongated grains, as opposed to blocky or equidimensional grains, i.e. "strong shaped" grains produced by impact crushing. A weaker shaped grain has been found to result in better fracture of the alumina-zirconia abrasive grains used in this invention and slower development of wear flats.

In general crushing abrasive particles several sizes coarser than that desired finally promotes a weaker shaped abrasive grain. For example, rolls crushing ¼ inch abrasive particles to grit 36 results in weaker shaped abrasive grains than in crushing grit 24 particles to the same size.

Weak shaped abrasive grains can, of course, be either angular or pencil shaped, the important consideration being that they not be equidimensional. By this is meant the maximum to minimum (or major to minor) dimensional ratio should be, e.g., 1.2:1 and higher.

In the electrostatic coating operations, conventionally used in the application of abrasive grains to a backing member, a weak shaped grain is oriented with its long axis essentially normal to the abrasive material surface. This leads to an increase in the number of abrasive grains presenting rake angles favorable for cutting, rather than plowing or rubbing of, the work piece surface. These oriented abrasive grains, moreover, have a smaller cross-section parallel to the abrasive surface, which results in a lower rate of generation of total flat area with wear of the abrasive grains and thus a retention of higher pressure per abrasive grain.

In certain application, and with certain compositions of this invention, e.g., the less the zirconia content, there may be a need for intensification of the force on the abrasive grains. This can be accomplished, as is known by those in the art, in a number of ways. One method, for example where an abrasive belt is used, is to increase the contact wheel density. Another means of increasing unit pressure on individual abrasive grains in a grinding operation is to mix the alumina-zirconia grain with other abrasive materials. Thus, the alumina-zirconia abrasive grain is advantageously mixed with other abrasive grains of different shape and/or composition. In some cases it may be desirable to mix elongated grains produced by rolls crushing (having a typical maximum to minimum dimensional ratio of 1.2:1 and higher), with equidimensional grains produced by impact crusing.

Obviously, where the alumina-zirconia abrasive grain is used with another, either of different size or shape, or of a different abrasive composition, the diluent abrasive grain need not necessarily be mixed with the alumina-zirconia abrasive grain. The diluent abrasive grain can be, for example, applied to the backing member first, e.g., by gravity coat, followed by application of the alumina-zirconia abrasive grain. The latter abrasive grain coat can be, if desired, applied by conventional electrostatic techniques such as is disclosed in U.S. Pat. No. 2,970,929.

One manner of double grain coating used in the practice of this invention involves the application of two maker coats. With this manner of manufacture, the adhesive coating weights applied are, in general, equal; however, these weights can vary where it may be desired, for example, to pick up a greater amount of abrasive grain in one layer than the other. The relative proportions of abrasive grain applied in the two grain applications can vary somewhat, of course, depending on the use for the particular abrasive material. Relative densities of the abrasive grains will, of course, need be taken into consideration when the abrasive grains are of different abrasive compositions, e.g., alumina-zirconia and alumina.

In practicing this aspect of the invention, one may apply from about 50 to 65% of the total abrasive grain applied, by the gravity method. The amount applied will depend, of course, on the coarseness of the abrasive particles. The coarser the abrasive grain, the greater the amount applied initially. The total weight of grain to be applied in any given case depends largely upon the size of the abrasive grain employed and may be varied between relatively wide limits. The practical amounts of both abrasive and adhesive can easily be determined by one skilled in the coated abrasive art.

Having obtained abrasive grain of the desired composition and grit size, the manufacture of coated abrasive material is accomplished in a manner well known to the art. The backing member, which may be of various materials conventionally used in the coated abrasive industry, e.g., paper, cloth, fiber or combination backing materials, is finished according to usual well known techiques and is then coated with adhesive material followed by the application of abrasive grain.

One or more maker adhesive coats, as beforementioned, can be applied, as desired, which can be of natural or synthetic adhesive binders. The preferred adhesive composition is a heat hardenable resin, particularly an uncured pheno-formaldehyde or modified pheno-formaldehyde resin. Following the adhesive appplication, the abrasive grain is applied after which the adhesive can be dried and cured according to well known techniques. An adhesive size coat is optionally, and generally, applied after drying and only partially curing of the maker adhesive layer. The adhesive layers are then cured to the desired degree.

Examples of the invention follow which are not to be taken as limiting thereon but merely as illustrative of the preferred embodiments thereof.

EXAMPLE 1

A fused alumina-zirconia abrasive composition was prepared and rapidly chilled during casting as described in the abovementioned Pett and Kinney patent application. It was determined by conventional wet chemical analysis to have the following composition:

| COMPONENT | PERCENT BY WEIGHT |
|---|---|
| $ZrO_2$ | 25.9 |
| $Al_2O_3$ | 72.9 |
| $SiO_2$ | 0.4 |
| $Fe_2O_3$ | 0.2 |
| $TiO_2$ | 0.64 |
| $Na_2O$ | 0.1 |

The abrasive material was determined to have a primary alumina numerical average crystal size of less than 20 microns and a eutectic colony size of less than 25 microns. A number of crude batches so manufactured were combined together and impact crushed by conventional means to ¼ inch chunks. These chunks were then rolls crushed to abrasive grain ranging in size, through 14 mesh on 28 mesh (U.S. Standard screens or equivalent) for use in the manufacture of coated abrasive material.

EXAMPLE 2

Vulcanized fiber-mat sheet stock 30 mils thick and 36 inches wide was set out in the manufacturing area and allowed to reach temperature and humidity equilibrium relative to ambient conditions. A phenolic resin based adhesive composition was prepared by mixing together 28 pounds of a one-stage liquid phenol-formaldehyde resin having a solids content of 73% and a $CH_2O$ to $C_6H_5OH$ ratio (FP) of 1.7, 11.3 lbs. of a one-stage liquid phenol-formaldehyde resin having a solids content of 80% and a $CH_2O$ to $C_6H_5OH$ ratio of 1.0, and 56 pounds of precipitated calcuim carbonate with an average particle size of about 15 microns. This adhesive composition was placed in the heating apparatus of a sandpaper machine and its temperature brought up to about 100°F.. The warm adhesive was applied as the maker coat on the vulcanized fiber-mat sheet stock in the amount of 28 pounds per sandpaper maker's ream, upon which was electrostatically deposited the $ZrO_2$—$Al_2O_3$, through 14 on 28 mesh (24 grit), abrasive grain described in Example 1, on the quantitative basis of 80 pounds per sandpaper maker's ream. The backing member, so coated, was passed through a sandpaper drying room which subjected it to a 4 hour heat treatment cycle which ran from 125° to 225°F.

A sizing adhesive was then compounded of 27 pounds of a 73% solids phenol-formaldehyde resin, 11 pounds of an 80% solids phenol-formaldehyde resin, and 54 pounds of calcium carbonate, all like those materials used in the maker adhesive coat, to which was added 7.4 pounds of water and 2.5 pounds of brown dye. The size coat was deposited on the maker coated backing member in a sandpaper machine at 100°F. and in an amount equal to about 29 pounds per sandpaper ream. The size coat was then cured in a sandpaper drying room, in a 15¾ hour heat cycle which traversed from 100° to 235°F..

Grinding discs were cut from this coated abrasive sheet stock.

EXAMPLE 3

A double coated abrasive material was made by the following method, employing a 25% alumina-zirconia abrasive corresponding to that of Example 1 in both coats. Alternatively, the gravity coat can be conventional commercial fused alumina, 98% $Al_2O_3$. In any case, the techniques of U.S. Pat. No. 2,970,929 can be advantageously employed.

The fabric selected for the backing material was a glue-starch finished woven fabric, 42 inches wide and weighing 7 ounces/square yard, with a 2 × 1 twill construction, a count of 76 in the warp and 48 in the fill, and, yarn members of 12.5's warp and 17's fill. A maker adhesive consisting of 5.8 pounds of a glycol modified one-stage liquid phenol-formaldehyde resin with a $CH_2O$ to $C_6H_5OH$ ratio of 1.5, 4.6 pounds of precipitated calcium carbonate (15 micron average particle size), and 0.4 pound of water, was mixed, placed in the appropriate heating tank on a sandpaper machine, and heated to 100°F.. The backing material was coated with the maker adhesive (26.4 lbs. per sandpaper maker's ream), to which was then added, by gravity coat, 30 pounds per sandpaper maker's ream of the 24 grit alumina-zirconia abrasive grain described in Example 1 above. The abrasive-adhesive coated backing material was then heated at 150°F. for 1½ hours, 200°F. for ½ hour, and 225°F. for 1 hour, in a sandpaper drying room.

A second maker adhesive coat was applied, being the same in composition and amount as the first maker coat, upon which 55 pounds per sandpaper ream of the 24 grit $Al_2O_3$–$ZrO_2$ abrasive was electrostatically deposited. This was cured using the same time-temperature cycle that was used to cure the first maker coat.

The final size coat was then deposited thereon at 100°F. by utilizing a sandpaper sizing machine; the size coat was compounded of 1.1 pounds of a 75% solids glycol modified liquid one-stage phenol-formaldehyde resin, 0.3 pound of an 80% solids glycol modified liquid one-stage phenol-formaldehyde resin, 2.3 pounds of precipitated calcium carbonate (15 micron average particle size), and 0.7 pound of water. An amount of sizing was deposited so as to amount to approximately 26.5 pounds per sandpaper ream. The size coat was cured by heat treating ½ hour at 100°F., ½ hour at 125°F., 1 hour at 175°F., ½ hour at 200°F., and 1 hour at 250°F..

From this finished coated abrasive sheet stock, strips of appropriate size were cut out and assembled into belts.

EXAMPLE 4

Impact crushed (−¼ inch, + 16 mesh) abrasive grain material, which had been manufactured by casting onto lumps (−¾ inch) of the same composition for rapid cooling of the abrasive composition, was rolls crushed and screened in conventional fashion to provide abrasive grain (grit size 36, as defined in P.S. 8–67, United States Department of Commerce) for manufacture of coated abrasive material.

The abrasive grain was a composite of three lots of abrasive material having the chemical analysis and eutectic colony size indicated below:

| LOT NO. COMPONENT (% BY WEIGHT) | 7354 | 7355 | 7357 |
|---|---|---|---|
| $ZrO_2$ | 44.04 | 44.48 | 39.53 |
| $Al_2O_3$ | 55.11 | 54.90 | 59.49 |
| $SiO_2$ | 0.53 | 0.30 | 0.68 |
| $Fe_2O_3$ | 0.10 | 0.10 | 0.11 |
| $TiO_2$ | 0.17 | 0.17 | 0.14 |
| $Na_2O$ | 0.05 | 0.05 | 0.05 |
| | 100.00 | 100.00 | 100.00 |
| AVG. COLONY SIZE (MICRONS) | 32 | 33 | 30 |

The abrasive grain, which was of a weak shape, when observed under an optical microscope, was seen to have the psuedo hackly fracture before described.

To a 30 mil vulcanized fiber backing member (10 × 11) was applied (29.0 lbs. per sandpaper maker's ream) a maker adhesive having the following composition:

| COMPONENT | WEIGHT (GRAMS) |
|---|---|
| 1) a one-stage liquid phenol-formaldehyde resol resin — F/P ratio 1.7:1 — caustic catalyzed — solids content 73% | 1644 |
| 2) a one-stage liquid phenol-formaldehyde resol resin — F/P ratio 0.94:1 — caustic catalyzed — solids content 78.4% | 650 |
| 3) $CaCO_3$ (14 microns) | 3300 |
| 4) $H_2O$ (to give viscosity at 100°F. 8000 centipoise) | 165 |

The abrasive grain was then electrocoated, according to usual techniques for upper propulsion, onto the maker adhesive (68.8 lbs. per sandpaper maker's ream) after which the coated backing member was heated for 45 minutes at 140°F., 45 minutes at 175°F., 60 minutes at 220°F., and 90 minutes at 250°F..

A size coat was then applied (amount added is determined visually and depends on grain type - wet weight 27.0–29.4 lbs. per s.p.m.r.) to the abrasive grain-maker adhesive surface, this being of the same composition as the maker adhesive except that it had been further diluted with water (viscosity at 100°F. of 2300 centipoise). Drying and curing was then accomplished by heating the coated backing member for 45 minutes at 115°F., 60 minutes at 150°F., 45 minutes at 175°F., 45 minutes at 200°F., 180 minutes at 225°F., and 45 minutes at 235°F..

The coated abrasive material thus manufactured was then conditioned (at 50% relative humidity, 70°F.) overnight after which a 7 inch diameter disc was die-cut therefrom for evaluation on 1020 L. C. steel. Prior to evaluation, the abrasive disc was curl corrected according to usual techniques by double flexing, one flex being in a direction perpendicular to the other.

The abrasive disc was evaluated in a mechanical disc tester against a control disc of similar abrasive material except the abrasive grain was of conventional high purity alumina. In this test, a workpiece (⅛ × 1 × 9¾ inch angle iron) oscillates back and forth over a distance of 9¾ inches at 7 feet per minute, the ⅛ inch face being ground with the abrasive disc rotating at a speed of 3450 rpm and being at an angle of 10° with the surface being ground. A force of 12 lbs. is maintained against the workpiece by a phenolic back-up pad. Over a 10 minute period, the coated abrasive disc of this invention cut 122% as much metal as the control abrasive disc.

EXAMPLE 5

Abrasive discs, as in Example 4, were evaluated for performance on 304 stainless steel. The test was the same except that a force of only 10 pounds was used. This test, a standard test for evaluation of stainless steel, is run for only 6 minutes. The abrasive disc according to the invention cut 113% that of the control disc.

EXAMPLE 6

In this example, abrasive grain was used to manufacture coated abrasive material as disclosed in Example 2 except that the abrasive material was rolls crushed to weak shaped grit 36. The abrasive material, which was of the following compositions,

| COMPONENTS | PERCENT BY WEIGHT |
|---|---|
| $ZrO_2$ | 25.76 |
| $Al_2O_3$ (by difference) | 70.85 |
| $SiO_2$ | 0.73 |
| $FeO_3$ | 0.19 |
| $TiO_2$ | 2.47 |
| | 100.00 | was obtained by casting the fusion of alumina-zirconia (primary crystals less than 30 microns) onto lumps (−1 ½, +¾ inch) of the same composition contained in a 50 lb. ingot mold.

Abrasive discs were cut from the abrasive material and were evaluated as described in Example 4 and 5, respectively, on 1020 L.C. steel and 304 stainless steel against control discs of conventional high purity aluminum oxide abrasive grain. The results are indicated below.

| ABRASIVE MATERIAL | PERCENT CUT TYPE STEEL | |
| --- | --- | --- |
| | 1020 | STAINLESS |
| CONTROL | 100 | 100 |
| LOT 7282 | 113 | 88 |

It is seen from the above data, when compared to Example 5, that performance on stainless steel is much better with the alumina-zirconia eutectic abrasive material. Thus, coated abrasive articles having abrasive grains of the eutectic composition are more generally useful than are abrasive articles in which the abrasive grain is of a lesser zirconia content.

EXAMPLE 7

Abrasive grain as in Example 6, i.e., nominally 25% zirconia, was used to manufacture coated abrasive material as described in that example. The abrasive grain, however, differed from that disclosed in Example 6 in that it had a stronger, i.e., more equidimensional shape.

In evaluation, as before-described, on 1020 steel and stainless steel, and against a control differing in that it was of conventional alumina abrasive grain, the following results were obtained:

| TEST PIECE (% CUT) | ABRASIVE MATERIAL | | | |
| --- | --- | --- | --- | --- |
| | CONTROL | LOT 7349 | | |
| | | 1 | 2 | 3 |
| 1020 | 100 | 92 | 78 | 78 |
| 304SS | 100 | 68 | — | — |

Thus, it is seen that abrasive grain in accordance with the invention with a weaker shape, as disclosed in Example 6, outperforms stronger shaped abrasive grain even though essentially of the same chemical composition.

Obviously performance could be somewhat improved by increasing the unit pressure on the abrasive grain. This could, of course, be accomplished by various means as before-described.

EXAMPLE 8

Abrasive grain as in Example 4 was used to manufacture a double coated abrasive material similar to that manufactured in Example 3.

An adhesive composition was prepared by mixing 18 lbs. of a resol phenol-formaldehyde resin (F/P ratio 2.08:1, caustic catalyzed, solids content 78%) modified with di-propylene glycol, 7.8 lbs. of a one-stage liquid phenol-formaldehyde resol resin (F/P ratio of 0.94:1, caustic catalyzed, solids content 78.4%), 31.1 lbs. $CaCO_3$ (14 microns), 2.5 lbs. water, and 27 grams RMR (DuPont) brown dye. This adhesive composition was placed in a conventional heating tank on a sandpaper machine and heated to 100°F. - viscosity was 7000 c.p.s., 3/12 spindle, Brookfield Viscosometer.

The backing member was coated with the maker adhesive (21.2 lbs./s.p.m.r.) to which was then added, by gravity, 21 lbs. (grit 36) conventional high purity alumina. These abrasive grains were reclaimed according to usual techniques from waste material. The maker-abrasive grain coated backing member was then heated for 25 minutes at 170°F., 25 minutes at 190°F., and 47 minutes at 225°F..

A second maker adhesive coat (23.4 lbs./s.p.m.r.) was then applied, being the same in composition as the first. On this adhesive layer was then electrocoated (conventional upper propulsion techniques) 45.3 lbs. of the alumina-zirconia abrasive grain. This was heated according to the same time-temperature cycle as the first maker coat.

The maker adhesive composition was diluted with water to provide a size composition of lesser viscosity (1100 c.p.s., 3/12 spindle, 100°F.). Size was applied, as conventionally done, and compared visually against a standard. The size coat was cured by heating the coated abrasive material in racks for 25 minutes at 125°F., 25 minutes at 135°F., 18 minutes at 180°F., 25 minutes at 190°F., and 15 minutes at 230°F.. The abrasive material was then rolled up and heated for 8 hours at 230°F..

The abrasive material, after roll curing, was humidified in the roll for 24 hours -105°F. dry bulb, 95°F. wet bulb, after which it was ready for manufacture into various abrasive articles.

Endless abrasive belts (2½ × 60 inch) were manufactured from the above coated abrasive material according to usual techniques. These were then evaluated in a conventional bench back stand belt tester on 1018 steel against a control belt, also double abrasive grain coated, except that the second abrasive grain coat was of the same high purity alumina abrasive material as the first. In this test, in general, a belt, positioned horizontally, is moved inwardly at a constant pressure and in a direction substantially normal against the ½ inch face of a workpiece (½ × 2½ × 9¾ inch) moving back and forth over a distance of 9¾ inches at 7 feet per minute. The abrasive belt, in this test, was driven at 4500 surface feet per minute (SFPM) over a medium soft canvas, vertically disposed, contact wheel (7 inch diameter) with a 15 lb. dead weight force exerted on the workpiece. The following results were obtained.

| ABRASIVE MATERIAL | TIME (MINUTES) | CUT (GRAMS) |
| --- | --- | --- |
| CONTROL | 30.0 | 666 |
| ZIRCONIA | 30.0 | 1102 |

As is indicated, the abrasive belt incorporating the alumina-zirconia abrasive material cut 162% that of the control abrasive belt. Comparison time was taken at 30 minutes since the abrasive belt of the invention cut a complete bar within that time (cut rate at this point was 22.5 grams/min.).

The control abrasive belt did not cut a complete bar even after 58 minutes. It dulled at that point after cutting only 865 grams (cut rate was only 3 grams/minute).

Thus, from the above data, one can readily see that abrasive belts in accordance with the invention not only result in greater overall cut, when compared to alumina abrasive belts, but also cut at a faster rate.

EXAMPLE 9

Abrasive belts as in Example 8 were evaluated on 304 stainless steel. In this test, the manner of testing is conventional for this type workpiece and is similar to that described in Example 8. A 90 durometer rubber plain face contact wheel was used. The abrasive belt speed was 3000 S.F.P.M..

The abrasive belts were arbitrarily evaluated for a period of 24 minutes. Over this time period, total cut was comparable. The control belt cut 119 grams while the alumina-zirconia abrasive belt cut only 122 grams.

In the dulling aspect of this test, however, wherein the abrasive belt evaluation is halted when the rate of cut drops to only 3 grams/min., the alumina-zirconia abrasive belt far outperformed the alumina abrasive grain product, as seen by the data below:

| ABRASIVE MATERIAL | TIME (MINUTES) | CUT (GRAMS) |
| --- | --- | --- |
| CONTROL | 28.0 | 132 |
| ZIRCONIA | 44.0 | 193 |

Thus, an abrasive belt in accordance with the invention as set forth herein can be used to advantage over a much longer period of time than an abrasive belt of grain solely of aluminum oxide. The significance of this will be appreciated by an operator in that not only is total cut from a single abrasive belt improved but belts will need be changed less frequently. Thus, downtime and cost of belt changing can be considerably reduced by using abrasive belts in accordance with the invention.

EXAMPLE 10

In this example, abrasive belts were manufactured from abrasive material manufactured as in Example 8 except that the abrasive material was nominally 25% zirconia, as in Example 1.

The first maker coat (which differed in that 24 grams of dye was used in the composition, 7900 c.p.s.) applied (23.08 lbs. per s.p.m.r.) was gravity coated with 30.4 lbs. $Al_2O_3$ (grit 24) after which the coated backing member was heated 26 minutes at 170°F., 26 minutes at 190°F. and 49 minutes at 225°F.. The second maker coat (26 lbs.) was electrocoated with 51.8 lbs./s.p.m.r. of the alumina-zirconia abrasive grain and the maker coated backing member subjected to the same time-temperature cycle as with the first maker coat.

A size coat was then applied, according to usual techniques, of the same composition as the maker adhesive except that it was diluted with water to a viscosity of 1250 c.p.s., 2/12 spindle, 100°F.. The size coated backing member was then heated at 100°F. for 30 minutes, 125°F. for 30 minutes, 155°F. for 22 minutes, and 170°F. for 49 minutes. It was then rolled and heated in this form for 19 hours at 225°F..

The roll cured abrasive material was humidified for 48 hours, as before-described, after which it was readied, according to usual techniques, for manufacture into abrasive articles.

An abrasive belt was evaluated, as in Example 8, on 1080 steel against a control belt from competitive abrasive material (CUBICUT) of alumina-zirconia abrasive grain.

The abrasive grain of the control abrasive belt was determined to be an alumina-zirconia composition, of near eutectic composition, having the following chemical analysis:

| COMPONENT | WEIGHT % |
| --- | --- |
| $Al_2O_3$ | 53.93 |
| $ZrO_2$ | 42.73 |
| $TiO_2$ | 1.76 |
| $SiO_2$ | 1.47 |
| $Fe_2O_3$ | 0.11 |
| | 100.00 |

The texture of the abrasive grain in polished section indicated the composition to be almost exclusively made of (grain) containing only eutectic colonies. A few alumina rich abrasive grains were present. The colony size was measured at 127 microns. X-ray diffraction indicated a pattern corresponding to a mixture of alpha alumina + monoclinic zirconia. Evidently, the abrasive material was heat treated as there was no evidence of cubic or cubic stabilized zirconia.

Physically, the abrasive grains of the competitive abrasive material were observed to be strong shaped, blocky, equidimensional grains. The abrasive particles had a somewhat grainy structure similar to the appearance of a tombstone; however, the psuedohackly fracture present in abrasive grain of the eutectic compositions of this invention was noticeably absent.

The results of the evaluation are given below:

| ABRASIVE MATERIAL | TIME (MINUTES) | CUT (GRAMS) |
| --- | --- | --- |
| 25% $ZrO_2$ | 82 | 1905 |
| CUBICUT (control) | 44 | 1084 |

One can readily see from this data that the 25% zirconia-alumina abrasive material in accordance with the invention far outperformed the competitive abrasive material.

Other abrasive belts of the same competitive material in other tests resulted in even less good results, e.g., 805, and 968 grams total cut. In all the testing, test results were determined when the rate of cutoff of the abrasive belts fell to 3 grams/min..

EXAMPLE 11

Abrasive grain (25% $ZrO_2$) as set forth in Example 6 was used to manufacture double coated abrasive material such as is disclosed in Example 8:

| | | |
| --- | --- | --- |
| FIRST MAKER COAT | — | 21.4 lbs./s.p.m.r. |
| FIRST GRAIN ($Al_2O_3$ — grit 36) COAT | — | 20.7 lbs./s.p.m.r. |
| SECOND MAKER COAT | — | 21.8 lbs./s.p.m.r. |
| SECOND GRAIN ($Al_2O_3$ — $ZrO_2$ — grit 36) COAT | — | 42.0 lbs./s.p.m.r. |

The first and second maker coats were subjected to the same time-temperature cycle, e.g., 30 minutes at 170°F., 30 minutes at 190°F. and 50 minutes at 225°F..

After curing the second maker coat, the abrasive material was conveniently sized with a less viscous maker adhesive composition (1050 c.p.s., 3/12 spindle, 100°F.) after which the coated backing member was heated for 30 minutes at 100°F., 30 minutes at 125°F., 23 minutes at 160°F., and 41 minutes at 170°F.. The abrasive material was rolled and heated in roll form for 19 hours at 225°F..

The abrasive material was then curl corrected in accordance with usual technique by water wetting the backing. From this abrasive material, abrasive belts (2½ × 60 inches) were manufactured and evaluated, as described in Example 8, on 1018 steel against a control abrasive belt (grit 36) of aluminum oxide. The control abrasive belt, as usual, was made from abrasive material manufactured at the same time as the experimental material except that is contained a second grain layer (40.2 lbs. per s.p.m.r.) of $Al_2O_3$. The results are indicated below:

| ABRASIVE MATERIAL | TIME (MINUTES) | CUT (GRAMS) |
|---|---|---|
| 25% LUMP CAST | 24 | 968 |
| CONTROL | 24 | 671 |

In this test, it took only 24 minutes with the abrasive belt of the invention to complete a bar of 1018 steel. The test was then stopped. The advantage of alumina-zirconia abrasive belts are believed obvious from this cut data.

EXAMPLE 12

Abrasive belts as in Example 11 (including control) were evaluated on 304 stainless steel. In this test an angle iron ⅛ × 1 × 1 × 9¾ inch is used which oscillates back and forth over a distance of 9¾ inches at 4 feet per minute. The belt travels over a medium soft contact wheel (7 inches diameter) at 5000 S.F.P.M. and is urged against the workpiece by an 18 lbs. dead weight force. The results are indicated below:

| ABRASIVE MATERIAL | TIME (MINUTES) | CUT (GRAMS) |
|---|---|---|
| 25% $ZrO_2$ | 20 | 149 |
| CONTROL | 20 | 182 |

One can seen by comparison with the data in Example 9 that abrasive belts having 25% zirconia abrasive grain thereon do not perform as well on stainless steel as do abrasive belts having abrasive grain of the alumina-zirconia eutectic abrasive composition.

EXAMPLE 13

Abrasive grain (nominally 25% $ZrO_2$ - grit 50) was electrocoated (41.4 lbs./s.p.m.r.) onto a maker coated backing member according to conventional upper propulsion techniques.

The backing member, like that before-described, was coated (20 lbs. per s.p.m.r.) with a maker adhesive having the composition set forth in Example 8 (viscosity 6250 c.p.s., 3/12 spindle) . To this was applied the alumina-zirconia abrasive grain, after which the coated backing member was heated 25 minutes at 170°F., 25 minutes at 190°F., and 47 minutes at 220°F..

The size coat was then applied (maker adhesive composition diluted with water to 650 c.p.s., 2/30 spindle, 100°F.) and the backing member heated 25 minutes at 125°F., 25 minutes at 135°F., 18 minutes at 180°F., 25 minutes at 190°F., and 15 minutes at 230°F..

The abrasive material was next rolled into a jumbo roll and heated in this form for 4 hours at 240°F. after which it was curl corrected for manufacture into abrasive articles.

A control was prepared in the same manner except the abrasive grain applied (41.3 lbs.) was a conventional grit 50 (1900 ALUNDUM) aluminum oxide.

Abrasive belts were manufactured from each of the abrasive materials and evaluated, as before-described on 1018 steel. The results are indicated below:

| ABRASIVE MATERIAL | TIME (MINUTES) | CUT (GRAMS) |
|---|---|---|
| 25% ZIRCONIA | 32 | 570 |
| CONTROL | 34 | 679 |

In this test, it is seen that in the finer abrasive grit sizes, performance falls off some for the alumina-zirconia abrasive material; however, in certain application performance will be found somehat better and even as good as or better than conventional aluminum oxide abrasive grain.

Performance with the finer grits will be found somewhat improved by providing a double coated abrasive material.

EXAMPLE 14

In this example the performance of so-called "lump cast" alumina-zirconia abrasive material as coated abrasive grain is evaluated against earlier differently cast similar abrasive compositions. A series of casting of abrasive material was made from a series of melts having the following chemical composition:

| COMPONENTS | PERCENT BY WEIGHT MELT | | |
|---|---|---|---|
| | 7916 | 7917 | 7920 |
| $ZrO_2$ | 42.86 | 41.33 | 40.60 |
| $Al_2O_3$ | 56.69 | 58.18 | 58.90 |
| $SiO_2$ | 0.18 | 0.16 | 0.16 |
| $Na_2O$ | 0.02 | 0.02 | 0.02 |
| $TiO_2$ | 0.15 | 0.15 | 0.16 |
| $Fe_2O_3$ | 0.10 | 0.16 | 0.16 |
| | 100.00 | 100.00 | 100.00 |

Since the melting and pouring procedure necessarily involved interrupted pouring with additions to the melt and, in some cases somewhat different raw materials for the fusion, the chemical composition of the various runs varied somewhat as indicated.

The fused molten abrasive compositions were cast into a number of different types of molds as described below:

1. 50 lbs. ingot mold — a cast iron mold having an interior mold cavity 8 by 18 by 9 inches.

2. 25 lbs. ingot mold — a cast iron mold having an interior mold caviity 5½ by 13½ by 4½inches.

3. lump cast — a cast iron mold 8 by 18 by 9 inches filled with ¾ inch lumps of abrasive grain having essentially the same composition and crystal structure as the abrasive material reported as melt 7920.

Crude from each of the above castings was jaw crushed to ½ inch chunks after which the abrasive chunks were rolls crushed to provide grit 36 abrasive grain. The abrasive grains were then screened, washed with water, and purged of magnetic particles. In contrast to the psuedo-hackly structure observed with the lump cast abrasive grain, the grains from the other castings were noticeably of a different oriented coarse structure.

A conventional resole phenol-formaldehyde maker adhesive composition was prepared by mixing together the following:

| COMPONENTS | WEIGHT |
|---|---|
| a liquid phenol-formaldehyde resol resin having a solids content of 78%, a formaldehyde to phenol ratio of 2.08 to 1, caustic catalyzed and modified with di-propylene glycol | 15.6 pounds |
| Number 2 liquid resin of Example 4 | 6.7 pounds |
| $CaCO_3$ (14 micron) | 26.9 pounds |

Water was added to the above to provide a composition having at 100°F., a viscosity of 7000 c.p.s.. This composition was coated on the front side of cotton drills woven backing members (7 oz./yd.$^2$) having a 2 × 1 twill construction, a yarn count of 76 in the warp and 48 in the fill directions, yarn numbers of 12s cotton warp and 17s fill, which had been provided with a conventional glue-starch back size and a calcium carbonate filled phenol-formaldehyde front size. Sufficient composition was deposited on each backing member to provide, on drying and curing, a maker adhesive coat of 25 lbs. per sandpaper maker's ream.

Subsequent to application of the maker adhesive composition, abrasive grains (62 lbs./s.p.m.r.) from the various castings above disclosed were electrostatically coated onto the respective adhesive coated backing members, after which, in each instance, the backing member was heated for 23 minutes at 175°F., 23 minutes at 195°F., 15 minutes at 210°F., and 23 minutes at 225°F.. A size coat (a less viscous maker composition) was then applied and each adhesive coated backing member was then heated for 26 minutes at 130°F., 26 minutes at 140°F., 18 minutes at 180°F., 25 minutes at 190°F., 25 minutes at 200°F., and 15 minutes at 230°F.. After this the abrasive material was given a final cure for 8 hours at 230°F..

The size adhesive composition was prepared of the same components as the maker adhesive except that sufficient water was added thereto to provide a composition having a viscosity of 1000 c.p.s. at 100°F.. The amount size composition applied, was determined to visually compare with a conventional standard for this type abrasive material.

The abrasive material was then rubber roll single flexed, according to usual techniques, after which it was slit into appropriate widths and lengths for manufacture of endless belts (2½× 60 inches). The abrasive belts were then evaluated on 1018 steel (two different lots) as before-described in Example 8 except the belt speed was 5000 S.F.P.M. and a 55 durometer, rubber, vertically disposed, serrated contact wheel (7 inch diameter) was used.

Abrasive material was manufactured in a similar manner as a control for evaluation of the alumina-zirconia abrasive compositions, except that 1900 ALUNDUM - a high purity alumina-abrasive grain was used. The amount of abrasive grain applied was 64 lbs./sandpaper makers's ream. The results are indicated below:

| ABRASIVE MATERIAL | 1018 (L) GRAMS CUT | 1018 (L) PERCENT OF CONTROL | 1018 (I) GRAMS CUT | 1018 (I) PERCENT OF CONTROL |
|---|---|---|---|---|
| CONTROL NO. 1 | 1895 | * | 1166 | * |
| 50 LB. INGOT (7916) | 2540 | 132 | 1525 | 138 |
| 25 LB. INGOT (7917) | 2564 | 134 | 1489 | 135 |
| CONTROL NO. 2 | 1942 | * | 1040 | * |
| LUMP CAST (7920) | 2679 | 140 | 1657 | 150 |

*As testing was done at different times and with different controls, an average of both controls was taken as 100%.

In this test, the cut results are cumulative over measured 2 minute time periods. When the cut in any 2 minute period is less than 20 grams, the test is halted. It is never run for more than 60 minutes. As can be seen from the above data, the lump cast abrasive grain product shows a considerable improvement in cut with both lots of 1018 compared to the control abrasive product. In each lot of steel it also shows an improvement in cut compared to alumina-zirconia abrasive grain from earlier methods of casting.

The abrasive materials were also analyzed by scanning electron microscope to determine eutectic colony size, $ZrO_2$ rod spacing and $ZrO_2$ rod size. The results are as follows:

TABLE 2

| MELT NO. | CASTING METHOD | EUTECTIC COLONY SIZE (MICRONS) | | | $ZrO_2$ ROD AND/OR PLATELET SIZE (MICRONS) | | | $ZrO_2$ ROD AND/OR PLATELET SPACING (MICRONS) | | |
|---|---|---|---|---|---|---|---|---|---|---|
| | | MIN. | MAX. | AVE. | MIN. | MAX. | AVE. | MIN. | MAX | AVE. |
| 7916 | 50 lb. Ingot | 20 | 500 | 165 | 0.1 | 0.8 | 0.36 | 0.3 | 1.2 | 0.55 |
| 7917 | 25 lb. Ingot | 14 | 370 | 115 | 0.15 | 0.6 | 0.29 | 0.28 | 0.74 | 0.54 |
| 7920 | Lump Cast | 8 | 80 | 32 | 0.2 | 0.6 | 0.28 | 0.3 | 1.4 | 0.51 |

EXAMPLE 15

Three different fusions were cast to provide abrasive material for evaluation in coated abrasive products. Abrasive compositions having the following chemical analysis and primary crystal size were obtained:

| COMPONENT | PERCENT BY WEIGHT LOT NOS. | | |
|---|---|---|---|
| | 7723 | 7724 | 7725 |
| $Al_2O_3$ (Difference) | 75.29 | 75.10 | 73.53 |
| $ZrO_2$ | 24.15 | 24.16 | 25.89 |
| $SiO_2$ | 0.12 | 0.28 | 0.16 |
| $Na_2O$ | 0.06 | 0.06 | 0.07 |
| $TiO_2$ | 0.32 | 0.30 | 0.25 |
| $Fe_2O_3$ | 0.06 | 0.10 | 0.10 |
| | 100.00 | 100.00 | 100.00 |
| PRIMARY CRYSTAL SIZE (Microns) | 117 | 38 | 28 |

Crude chunks (½ inch) were rolls crushed to provide abrasive grain of grit size 36, after which the rolls crused material was screened, washed and magnetic particles separated out, all according to usual techniques.

Coated abrasive material was then manufactured as follows:

1. A backing member (42 inches wide and weighing 7 oz./yd.², 2 × 1 twill construction, a count of 76 in the warp and 48 in the fill, yarn numbers of 12.5's warp and 17's fill) comprising a glue-starch finished woven cotton fabric was coated, in conventional manner, with a maker adhesive having the following composition:

| COMPONENT | WEIGHT (lbs.) |
|---|---|
| a glycol modified, caustic catalyzed, resol phenol-formaldehyde resin, F/P ratio 2.08, 78% avg. solids in water | 18 |
| a caustic catalyzed phenol-formaldehyde resin, F/P ratio 0.94, solids content 78% avg. in water | 7.8 |
| $CaCO_3$ (14 microns) | 31.0 |
| $H_2O$ | 2.5 |
| Pontamine Brown Dye | 21 grams |

The viscosity of the composition was adjusted with water to 6900 cps at 100°F. for coating and 21.5 lbs. per s.p.m.r. (wet weight) was provided on the backing member.

2. To the wet maker layer was applied, by gravity, 21.8 lbs./s.p.m.r. high purity (98%) aluminum oxide abrasive grain (grit 36).

3. The maker adhesive was dried and partially cured by subjecting the coated backing member to the following heat treatment cycle; 25 minutes at 170°F., 25 minutes at 190°F., and 47 minutes at 225°F..

4. A second layer of maker adhesive was then applied, the amount thereof and composition being the same as before except the viscosity was adjusted to 6300 c.p.s. (100°F.).

5. The alumina-zirconia abrasive grain above-described was then deposited (conventional electrostatic means) onto backing members as set forth in step 4, the amount applied in each coat being indicated below:

| LOT | AMOUNT (lbs./s.p.m.r.) |
|---|---|
| 7723 | 36.9 |
| 7724 | 34.0 |
| 7725 | 35.0 |

6. The coated backing members were then heated as set forth in step 3 after which a size coat was applied (28 lbs./s.p.m.r. wet) of the same composition as the maker coat but diluted with water to 1120 c.p.s. (100°F.).

7. The adhesive on the coated backing members was then cured as follows: 25 minutes at 125°F.; 25 minutes at 135°F.; 18 minutes at 180°F.; 25 minutes at 190°F.; and 15 minutes at 230°F.. Afterwards, the abrasive materials were rolled up and subjected to 8 hours heating at 230°F..

Coated abrasive material was manufactured in the same way except high purity alumina was used in both grain layers.

On removal from the final curing stage, the rolls of abrasive material were allowed to cool overnight after which they were humidified 24 hours (dry bulb 105°F. - wet bulb 95°F.). The abrasive material was then flexed according to usual techniques, cut and manufactured into endless belts for testing.

In this test, the abrasive belt, positioned horizontally, was moved inwardly at a constant pressure (20 lb. dead weight force) and in a direction substantially normal against the ½ inch face of a 1018 steel work piece (½ × 2 × 9¾ inch) moving back and forth over a distance of 9¾ inches at 7 feet per minute. A steel, vertically disposed contact wheel (7 inch dia.) was used for the abrasive belts which was operated at 5000 S.F.P.M..

After 24 minutes the control abrasive belt shed; however, the alumina-zirconia abrasive belts still cut for a much longer time period. The results are indicated below:

TABLE 1

| ABRASIVE MATERIAL | TIME (MINUTES) | CUT (GRAMS) | % CUT |
|---|---|---|---|
| CONTROL | 24 | 596 | 100 |
| 7723 | 24 | 482 | 81 |
| 7724 | 24 | 667 | 112 |
| 7725 | 24 | 892 | 150 |

TABLE 2

| ABRASIVE MATERIAL | TIME (MINUTES) | CUT (GRAMS) | % CUT |
|---|---|---|---|
| CONTROL | 24 | 596 | 100 |
| 7723 | 36* | 622 | 104 |
| 7724 | 60** | 1347 | 228 |
| 7725 | 28** | 991 | 168 |

*Cut dropped to 20 grams during two minute interval.
**Belts shed at this point but rate of cut at time of shedding indicated substantial cutting life remaining in abrasive grain.

Coated abrasive articles made in accordance with the preferred aspects of the present invention have proven highly effective for grinding both high carbon steel and stainless steel. A significant advantage of this feature resides in the fact that a user may grind various types of steels without having to change abrasive belts or the like or without the necessity of having to stock coated abrasive articles of different grain compositions which are especially suited for particular grinding applications.

While certain representative embodiments and details have been shown for the purpose of illustrating the invention, it will be apparent to those skilled in the coated abrasive art that various changes and modifications may be made therein without departing from the spirit or scope of the invention.

What is claimed is:

1. A coated abrasive article comprising or plate flexible backing having co-fused alumina-zirconia abrasive grits adhesively bonded thereto, said alumina-zirconia abrasive having been solidified from the molten state at least as rapidly as is accomplished by casting molten alumina-zirconia abrasive into a mold filled with ¾ inch lumps of abrasive grains, said grits having an average maximum to minimum dimensional ratio of at least 1.2 to 1, the zirconia in the eutectic being in the form of rods or platelets with the average diameter or plate thickness being less than 3000 angstroms as measured at the colony centers, said alumina-zirconia grits containing from 20 to 50% zirconia, and including eutectic alumina-zirconia colonies having an average size of less than 65 microns, the adhesive bond being sufficiently strong to hold the alumina-zirconia grits to permit fracture thereof during grinding with creation of new cutting edges on the individual grits as the result of the fracture.

* * * * *

UNITED STATES PATENT OFFICE
CERTIFICATE OF CORRECTION

PATENT NO. : 3,893,826
DATED : July 8, 1975
INVENTOR(S) : James R. Quinan and Joseph E. Patchett It is certified that error appears in the above-identified patent and that said Letters Patent are hereby corrected as shown below:

Column 1, line 49; "Nay" should read — May —

Column 2, line 21; "some" should read — more —

Column 3, line 60; "sealing" should read — scaling —

Column 3, line 61; "X" should read — some —

Column 4, line 14; "stron" should read — strong —

Column 4, line 20; "thses" should read — these —

Column 4, line 40; correct the equation to read —

$$d_1 \cong \sqrt{\frac{\prod d_2^{\,2}}{4V_f}}$$

Column 5, line 49; "theretofore" should read — heretofore —

Column 19, line 3; "crused" should read — crushed —

Claim 1, line 1; "or plate" should read — a —

Signed and Sealed this twenty-fifth Day of November 1975

[SEAL]

Attest:

RUTH C. MASON
*Attesting Officer*

C. MARSHALL DANN
*Commissioner of Patents and Trademarks*